United States Patent
Knope et al.

(10) Patent No.: US 11,619,956 B2
(45) Date of Patent: Apr. 4, 2023

(54) NONLINEAR TRIM HEAD POWER SUPPLY WITH A WIDE INPUT RANGE AND A HIGH EFFICIENCY

(71) Applicant: Hamilton Sundstrand Corporation, Charlotte, NC (US)

(72) Inventors: Daniel Knope, Rockton, IL (US); Adrian E. Vandergrift, Rockton, IL (US); Francisco X. Romo, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 412 days.

(21) Appl. No.: 16/818,347

(22) Filed: Mar. 13, 2020

(65) Prior Publication Data
US 2021/0286388 A1 Sep. 16, 2021

(51) Int. Cl.
*G05F 1/46* (2006.01)
*H02M 5/48* (2006.01)
*H02M 1/00* (2006.01)

(52) U.S. Cl.
CPC ............ *G05F 1/46* (2013.01); *H02M 5/48* (2013.01); *H02M 1/0083* (2021.05)

(58) Field of Classification Search
CPC ......... H02M 7/10–40; H02M 7/42–64; H02M 5/48; G05F 1/46
See application file for complete search history.

(56) References Cited

U.S. PATENT DOCUMENTS

| | | |
|---|---|---|
| 4,467,267 A | 8/1984 | Hucker et al. |
| 4,821,166 A | 4/1989 | Albach |
| 5,594,322 A | 1/1997 | Rozman et al. |
| 9,401,640 B2 | 7/2016 | Karlsson et al. |
| 10,320,279 B2 | 6/2019 | Cheng et al. |
| 10,447,162 B2 | 10/2019 | Matsumoto |
| 10,480,970 B2 | 11/2019 | Li |
| 10,528,023 B2 | 1/2020 | Steinbach |
| 2004/0108726 A1* | 6/2004 | Sarlioglu ............ F02N 11/0859 290/38 R |
| 2015/0171743 A1* | 6/2015 | Yeon ....................... G05F 1/575 323/282 |
| 2015/0244303 A1* | 8/2015 | Gao ........................ F02N 11/04 290/32 |
| 2016/0365814 A1* | 12/2016 | Gieras ....................... H02P 9/48 |
| 2018/0181088 A1 | 6/2018 | Steinbach |

FOREIGN PATENT DOCUMENTS

| | | |
|---|---|---|
| EP | 1791244 A2 | 5/2007 |
| EP | 2416475 A2 | 2/2012 |
| EP | 3116119 A1 | 1/2017 |

OTHER PUBLICATIONS

Extended European Search Report for EP Application No. 21156917.3 dated Jul. 23, 2021, pp. 1-7.

* cited by examiner

*Primary Examiner* — Thienvu V Tran
*Assistant Examiner* — Shahzeb K Ahmad
(74) *Attorney, Agent, or Firm* — Cantor Colburn LLP

(57) ABSTRACT

A trim head drive is provided. The trim head drive includes a nonlinear power supply. The nonlinear power supply includes an output and a return connected to a trim coil of a generator. An output of the nonlinear power supply directly drives a trim coil to control an output frequency of the generator. The nonlinear power supply varies the output positively and negatively to either sink or source a trim head current to control an output frequency of the generator.

17 Claims, 3 Drawing Sheets

NONLINEAR TRIM HEAD POWER SUPPLY WITH A WIDE INPUT RANGE AND A HIGH EFFICIENCY

BACKGROUND

Exemplary embodiments pertain to a nonlinear trim head power supply with a wide input range and a high efficiency.

In general, current trim head drive circuits (also referred to as supplies and/or drivers) are linear designs. Linear designs have limited input voltage range. Further, these linear designs make current trim head supplies/drivers inefficient and power hungry.

BRIEF DESCRIPTION

In accordance with one or more embodiments, a trim head drive is provided. The trim head drive includes a nonlinear power supply. The nonlinear power supply includes an output and a return connected to a trim coil of a generator. An output of the nonlinear power supply directly drives a trim coil to control an output frequency of the generator. The nonlinear power supply varies the output positively and negatively to either sink or source a trim head current to control an output frequency of the generator.

In accordance with one or more embodiments or the trim head drive embodiment above, the trim head drive can include a direct current voltage.

In accordance with one or more embodiments or any of the trim head drive embodiments above, the trim head drive receives a feedback from a system frequency sense of the generator.

In accordance with one or more embodiments or any of the trim head drive embodiments above, the nonlinear power supply can receive the feedback from the system frequency sense.

In accordance with one or more embodiments or any of the trim head drive embodiments above, the output of the nonlinear power supply can be varied based on the feedback received from the system frequency sense.

In accordance with one or more embodiments or any of the trim head drive embodiments above, the nonlinear power supply can include an electronic power supply with a switching regulator to convert electrical power.

In accordance with one or more embodiments or any of the trim head drive embodiments above, the nonlinear power supply can continually switch between low-dissipation, full-on, and full-off states minimizing power loss.

In accordance with one or more embodiments or any of the trim head drive embodiments above, the nonlinear power supply can accept a wider input voltage range with lower loss.

In accordance with one or more embodiments or any of the trim head drive embodiments above, a controller can include the trim head drive, and the controller drives the generator.

In accordance with one or more embodiments or any of the trim head drive embodiments above, a generator system can include the controller and the generator.

In accordance with one or more embodiments, a method is provided. The method includes generating, by a nonlinear power supply of a trim head drive, a voltage that a trim coil of a generator requires to provide a trim head current. The nonlinear power supply includes an output and a return that are connected to the trim coil. The method also includes receiving, by the trim head drive, a frequency from and sensed by a frequency sense of the generator. An output of the nonlinear power supply directly drives a trim coil to control an output frequency of the generator. The nonlinear power supply varies the output positively and negatively to either sink or source the trim head current to control an output frequency of the generator.

In accordance with one or more embodiments or the method embodiment above, the trim head drive can include a direct current voltage.

In accordance with one or more embodiments or any of the method embodiments above, the trim head drive receives a feedback from a system frequency sense of the generator.

In accordance with one or more embodiments or any of the method embodiments above, the nonlinear power supply can receive the feedback from the system frequency sense.

In accordance with one or more embodiments or any of the method embodiments above, the output of the nonlinear power supply can be varied based on the feedback received from the system frequency sense.

In accordance with one or more embodiments or any of the method embodiments above, the nonlinear power supply can include an electronic power supply with a switching regulator to convert electrical power.

In accordance with one or more embodiments or any of the method embodiments above, the nonlinear power supply can continually switch between low-dissipation, full-on, and full-off states minimizing power loss.

In accordance with one or more embodiments or any of the method embodiments above, the nonlinear power supply can accept a wider input voltage range with lower loss.

In accordance with one or more embodiments or any of the method embodiments above, a controller can include the trim head drive, and the controller drives the generator.

In accordance with one or more embodiments or any of the method embodiments above, a generator system can include the controller and the generator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
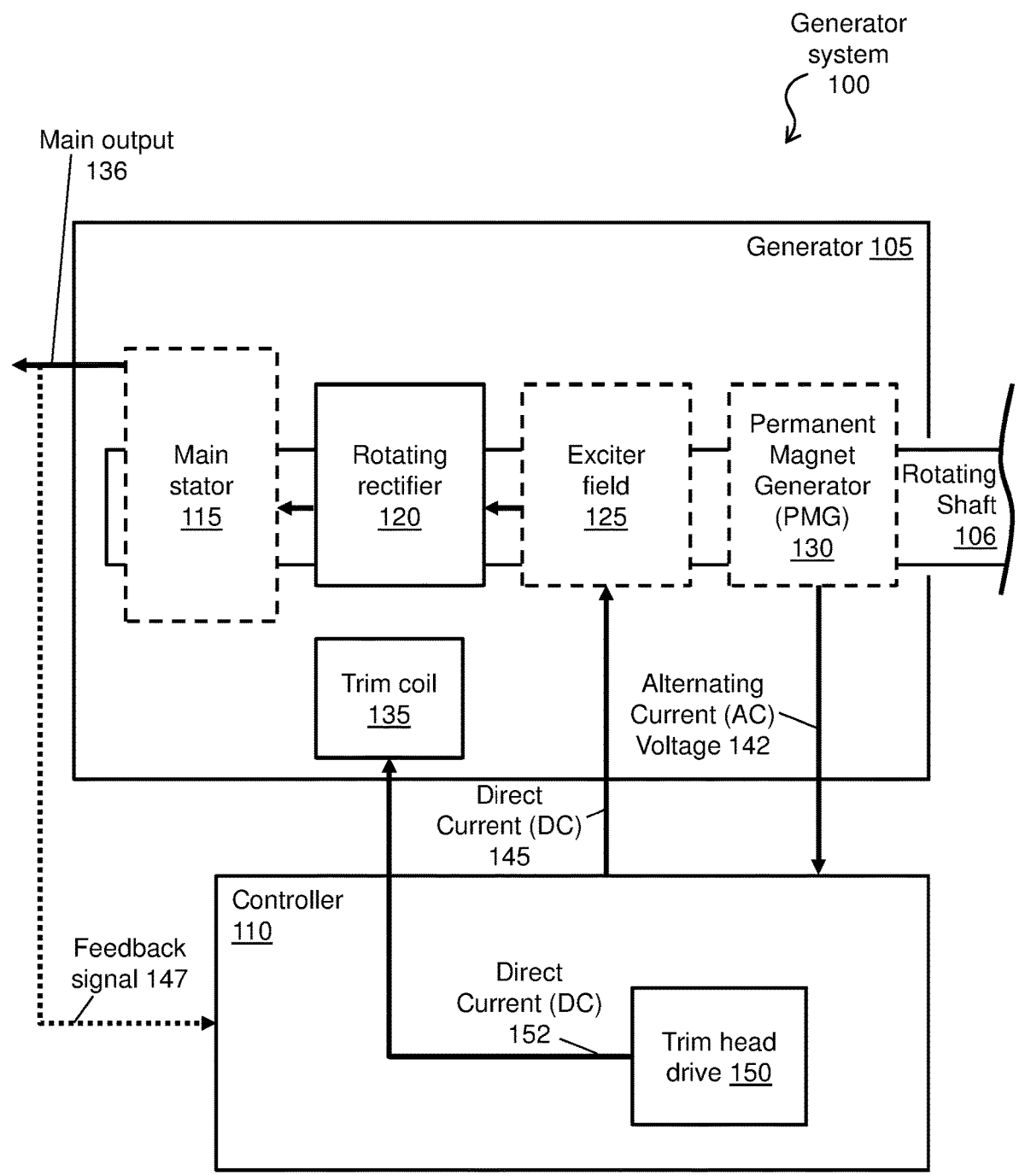
FIG. 1 depicts a generator system in accordance with one or more embodiments.

FIG. 1 depicts a generator system 100 in accordance with one or more embodiments. The generator system 100 includes a generator 105 configured with respect to a shaft 106 and a controller 110 (e.g., a generator control unit), which controls the generator 105.

The generator 105 includes a main stator 115, a rotating rectifier 120, an exciter field 125, a permanent magnet generator (PMG) 130, and a trim coil 135 each of which is operatively positioned along the shaft to provide a main output 136. The generator 105 is a device that converts mechanical energy from the shaft 106 to electrical energy. An example of the generator 105 includes a 3-Phase generator.

The controller 110 is a programmable electronic device that manages the operations of the generator 105. In this regard, the controller 110 can rectify an alternating current (AC) voltage 142 (e.g., generates/creates a direct current (DC) voltage that is proportional to a speed of the generator 105) and can provide a DC current 145 to the generator 105 based on this rectified AC voltage 142. Further, the controller 110 can also receive one or more feedback signals. For instance, the controller 110 can receive a feedback signal 147 from the main output 136.

The controller 110 includes, among other components, a trim head drive 150 that provides a direct current 152 to the trim coil 135 of the generator 105. The trim coil 135 is an inductor within the generator 105 that is used to control an output frequency of the generator 105. Generally, the trim head drive 150 controls/adjusts a voltage of the trim coil 135 within the controller 110 to control a trim current (e.g., a DC current 152).

Figure 2:
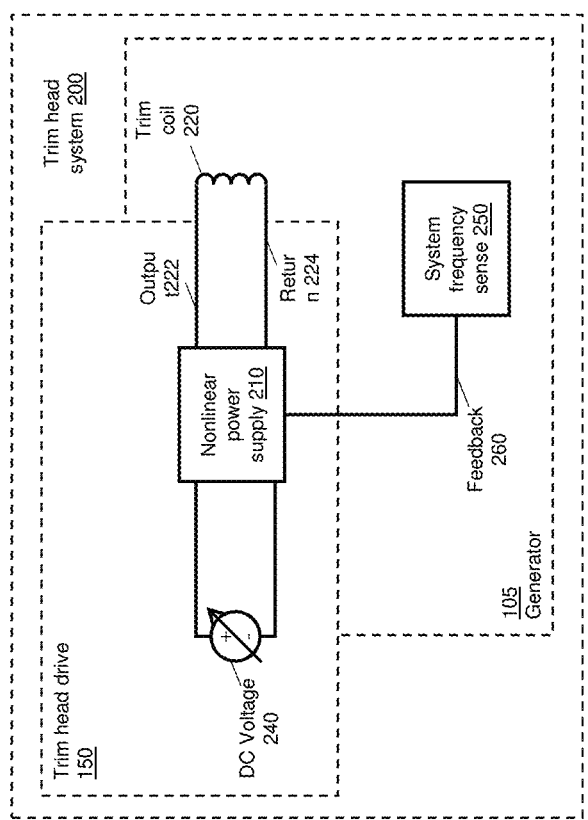
FIG. 2 depicts a trim head power supply in accordance with one or more embodiments.

FIG. 2 depicts a trim head system 200 according to one or more embodiments. The trim head system 200 is an example of aspects of FIG. 1 (e.g., the trim head drive 150 and the trim coil 135). In accordance with one or more embodiments, the trim head drive 150 refers to the controller 110 portion of the trim head system 200 (e.g., portions of the controller 110 of FIG. 1). The trim head drive 150 uses a nonlinear power supply with a wide input voltage range and a high efficiency.

As shown in FIG. 2, the trim head drive 150 includes a nonlinear power supply 210 that drives a trim coil 220, which are connected by an output 222 and a return 224. The trim head drive 150 also includes a direct current voltage 240. A generator 105 of the trim head system 200 includes a system frequency sense 250, which provides a feedback 260 to the nonlinear power supply 210 (e.g., the control mechanism is now connected to the nonlinear power supply 210 itself). Note that the components of the trim head system 200 are overlaid dashed boxes of the generator 105 and the controller 110 for illustrative purposes.

The nonlinear power supply 210 is an electronic power supply with a switching regulator to convert electrical power. Unlike a linear power supply, the nonlinear power supply 210 continually switches between low-dissipation, full-on and full-off states, which minimizes power loss. Further, by using the nonlinear power supply 210, a wider input voltage range with lower losses is provided since increases in input voltage have minimal impact on power dissipation.

Figure 3:
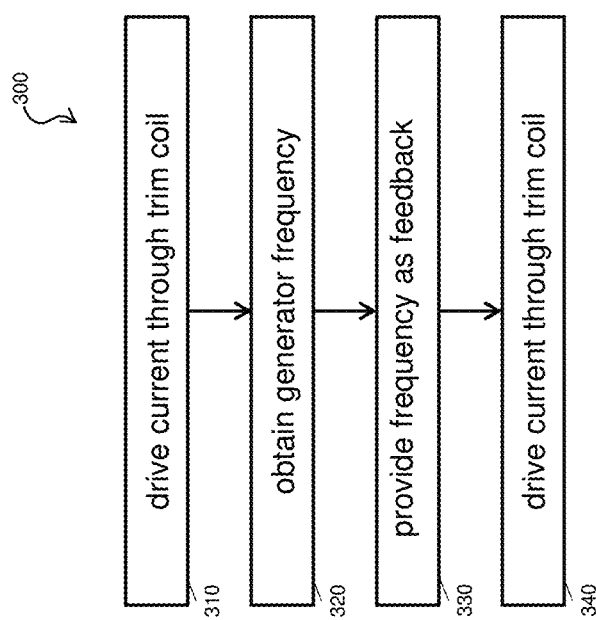
FIG. 3 depicts a process flow of the trim head power supply of FIG. 2 in accordance with one or more embodiments.

FIG. 3 depicts a process flow 300, as an example operation of the trim head system 200 of FIG. 2, according to one or more embodiments. The process flow 300 begins at block 310, where the nonlinear power supply 210 generates a voltage, which drives current through the trim coil 220. At block 320, a frequency of the system is sensed by the system frequency sense 250 of the generator 105. At block 330, this frequency is provided as the feedback 260 to the nonlinear power supply 210 of the trim head drive 150. At block 340, an output current is varied (by the nonlinear power supply 210 of the trim head drive 150) both positive and negative to either sink or source trim head current to control generator output frequency. More particularly, the nonlinear power supply 210 varies the output 222 (e.g., the direct current 152) positively and negatively based on the feedback 260 to either sink or source a trim head current (e.g., push and pull current in both directions through the trim coil 135) to control an output frequency of the generator 105.

The technical effects and benefits of the embodiments herein include, by using a nonlinear power supply, reducing power dissipation. Since an output voltage is adjusted to provide a trim head current, an input voltage can vary above or below the desired output. An example of this is a buck-boost converter. The technical effects and benefits of the embodiments herein also include that the topology of the trim head system 200 can be used with a variety of trim coils (e.g., trim coil 220), since the voltage is adjusted to deliver the current needed to keep the generator output frequency within regulation. In contrast, because existing current trim head drive circuits are linear designs, the input voltage range of these circuits is limited because as the input voltage increases the power dissipation also increases.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A trim head drive comprising:

a nonlinear power supply comprising an output and a return connected to a trim coil of a generator; and a controller configured to receive a feedback signal based on operation of the generator, the controller in signal communication with a permanent magnet generator and an exciter field, and in signal communication with the trim coil separately from the permanent magnet generator and an exciter field, wherein the controller rectifies an alternating current (AC) voltage received from the permanent magnet generator to generate a direct current (DC) voltage, and outputs the DC voltage to the exciter field;

wherein an output current of the nonlinear power supply directly drives the trim coil to control an output frequency of the generator, and wherein the nonlinear power supply includes a switching regulator, and wherein the controller monitors the output frequency of the generator indicated by the feedback signal and varies the output current positively and negatively to either sink or source a trim head current to control the output frequency of the generator.

2. The trim head drive of claim 1, wherein the trim head drive comprises a direct current voltage.

3. The trim head drive of claim 1, wherein the trim head drive receives a feedback from a system frequency sense of the generator.

4. The trim head drive of claim 3, wherein the nonlinear power supply receives the feedback from the system frequency sense.

5. The trim head drive of claim 3, wherein the output of the nonlinear power supply is varied based on the feedback received from the system frequency sense.

6. The trim head drive of claim 1, wherein the nonlinear power supply comprises an electronic power supply with a switching regulator to convert electrical power.

7. The trim head drive of claim 1, wherein the nonlinear power supply continually switches between low-dissipation, full-on, and full-off states minimizing power loss.

8. The trim head drive of claim 1, wherein a generator system comprises the controller and the generator.

9. A method comprising:
generating, by a nonlinear power supply of a trim head drive that includes a switching regulator and an output and a return that are connected to a trim coil, an output current to drive the trim coil via the output;
receiving, by a controller included in the trim head drive, a feedback signal indicative of a frequency from and sensed by a frequency sense of the generator,
rectifying, by the controller, an alternating current (AC) voltage received from the permanent magnet generator to generate a direct current (DC) voltage; and
outputting, from the controller, the DC voltage to the exciter field;
wherein the output current of the nonlinear power supply directly drives the trim coil to control the frequency of the generator, and
wherein the controller monitors the frequency of the generator indicated by the feedback signal and the nonlinear power supply varies the output current positively and negatively to either sink or source the trim head current to control an output frequency of the generator.

10. The method of claim 9, wherein the trim head drive comprises a direct current voltage.

11. The method of claim 9, wherein the trim head drive receives a feedback from a system frequency sense of the generator.

12. The method of claim 11, wherein the nonlinear power supply receives the feedback from the system frequency sense.

13. The method of claim 11, wherein the output of the nonlinear power supply is varied based on the feedback received from the system frequency sense.

14. The method of claim 9, wherein the nonlinear power supply comprises an electronic power supply with a switching regulator to convert electrical power.

15. The method of claim 9, wherein the nonlinear power supply continually switches between low-dissipation, full-on, and full-off states minimizing power loss.

16. The method of claim 9, wherein a controller comprises the trim head drive, and the controller drives the generator.

17. The method of claim 16, wherein a generator system comprises the controller and the generator.

* * * * *